United States Patent
Hofmann et al.

(10) Patent No.: US 12,032,463 B2
(45) Date of Patent: Jul. 9, 2024

(54) DATA MONITOR

(71) Applicant: Siemens Aktiengesellschaft, Munich (DE)

(72) Inventors: Stefan Hofmann, Munich (DE); Fritjof Kaiser, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/004,721

(22) PCT Filed: Jul. 7, 2021

(86) PCT No.: PCT/EP2021/068770
§ 371 (c)(1),
(2) Date: Jan. 9, 2023

(87) PCT Pub. No.: WO2022/008567
PCT Pub. Date: Jan. 13, 2022

(65) Prior Publication Data
US 2023/0251949 A1 Aug. 10, 2023

(30) Foreign Application Priority Data
Jul. 10, 2020 (DE) .................. 10 2020 208 687.7

(51) Int. Cl.
*G06F 15/16* (2006.01)
*G06F 3/14* (2006.01)
*G06F 11/32* (2006.01)

(52) U.S. Cl.
CPC ............. *G06F 11/324* (2013.01); *G06F 3/14* (2013.01)

(58) Field of Classification Search
CPC .................. G06F 3/14; G06F 11/324
USPC .................................... 709/224
See application file for complete search history.

(56) References Cited

U.S. PATENT DOCUMENTS

| | | | | |
|---|---|---|---|---|
| 6,906,630 B2 * | 6/2005 | Georges | ............ | G05B 23/0245 340/657 |
| 7,369,044 B2 * | 5/2008 | Ono | ........ | B60K 37/02 345/23 |
| 7,382,234 B2 * | 6/2008 | Yokota | ................... | B60K 35/00 340/439 |
| 7,573,377 B2 * | 8/2009 | Kageyama | ............. | B60K 37/02 340/459 |
| 8,436,810 B2 * | 5/2013 | Langereis | ............ | G04G 21/025 600/300 |
| 10,444,709 B2 * | 10/2019 | Carreel | ............. | G04B 37/0008 |

(Continued)

FOREIGN PATENT DOCUMENTS

| | | | | |
|---|---|---|---|---|
| DE | 10 2006 032 728 | 3/2007 | ................ | A61B 5/02 |
| DE | 10 2008 039 363 | 4/2009 | ......... | G02F 1/13357 |
| GB | 2 428 976 | 2/2007 | ............. | A61B 5/024 |

OTHER PUBLICATIONS

Search Report for International Application No. PCT/EP2021/068770, 13 pages, Oct. 20, 2021.

(Continued)

*Primary Examiner* — Moustafa M Meky
(74) *Attorney, Agent, or Firm* — Slayden Grubert Beard PLLC

(57) ABSTRACT

Various embodiments of the teachings herein include a digital data monitor comprising: a dial with indices indicating points in time; and a plurality of segments representing information about digital data or data streams arranged within and/or around the dial. Each of the segments is assignable to one index or a plurality of indices of the dial conveying a point in time and/or a time interval.

15 Claims, 2 Drawing Sheets

(56) References Cited

U.S. PATENT DOCUMENTS

| | | | |
|---|---|---|---|
| 11,221,232 B2* | 1/2022 | Peat | G01D 4/004 |
| 2002/0161558 A1* | 10/2002 | Georges | G05B 23/0245 |
| | | | 702/189 |
| 2006/0092001 A1* | 5/2006 | Yokota | B60K 37/02 |
| | | | 340/425.5 |
| 2009/0051853 A1 | 2/2009 | Thomas | 349/86 |
| 2009/0128487 A1* | 5/2009 | Langereis | A61B 5/02438 |
| | | | 345/157 |
| 2013/0289419 A1* | 10/2013 | Berezhnyy | A63B 71/06 |
| | | | 600/484 |
| 2015/0085622 A1* | 3/2015 | Carreel | G04B 47/063 |
| | | | 368/10 |

OTHER PUBLICATIONS

Office Action for DE 10 2020 208 687.7, 5 pages, Jan. 21, 2021.

Bhattacharyya S. et al.: "Geographical and Temporal Characteristics of Inter-Pop Flows: View From a Single Pop"; European Transactions on Telecommunications, Wiley & Sons, Chichester, GB, vol. 13, No. 1, pp. 5-22, Jan. 31, 2002.

Anonymous: "r—add geom bar to circular plot ggplot2—Stack Overflow"; XP055850144; Gefunden im Internet: URL:https://web.archive.org/web/20170117021536/https://stackoverflow.com/questions/26204826/add-geom-bar-to-circular-plot-ggplot2; Jan. 17, 2017.

Liuxuan, Pan et al: "Time Pattern Analysis of Malware by Circular Statistics"; Architectures for Networking and Communications Systems, IEEE Press, 445 Hoes Lane, pp. 119-130, XP058339811; May 18, 2017.

Wickham H. et al: "Product Plots"; IEEE Transactions on Visualization and Computer Graphics., [Online]vol. 17, No. 12, pp. 2223-2230, XP055849995; Dec. 31, 2011.

Anonymous: "Circular time plots in R"; XP055850021; Gefunden im Internet: URL:https://web.archive.org/web/20190107073054/http://rstudio-pubs-static.s3.amazonaws.com/3369 998f8b2d788e4a0384ae565c4280aa47.html; Jan. 7, 2019.

* cited by examiner

DATA MONITOR

CROSS-REFERENCE TO RELATED APPLICATIONS

This application is a U.S. National Stage Application of International Application No. PCT/EP2021/068770 filed Jul. 7, 2021, which designates the United States of America, and claims priority to DE Application No. 10 2020 208 687.7 filed Jul. 10, 2020, the contents of which are hereby incorporated by reference in their entirety.

TECHNICAL FIELD

The present disclosure relates to data monitoring. Various embodiments of the teachings herein include apparatuses for monitoring a digital data load of a device such as a computer, projector, tablet and/or smartphone over a certain time interval and/or in real time.

BACKGROUND

Many IT processes create large data quantities, these also being referred to as "big data". They are data quantities which in terms of their structuring are for example too large, too complex, too fast-moving, or too weak to be allowed to be evaluated using manual methods, for example by a user, or by way of conventional data processing methods and/or to allow a decision to be taken from the data quantity.

Therefore, these data quantities are generally prepared by artificial intelligence "AI", i.e. by an automated simulation of the user's decision-making structures. By way of example, the result of the preparation is visualized by an AI, in particular rotating arrows and/or bar charts. In the case of the tremendously rapid increase in data quantities and data streams within given networks, it is important for the user to be able to recognize which data quantities are currently being processed by the network or system. The user can thus recognize which data streams are loading the system that the user is working with, and the user can optionally choose which data streams are indispensable and which are dispensable.

It is frequently the case that data streams are represented as bar charts, or the user has to select a previously defined portion of the data stream. In this case, the display of these representations is often not designed for different terminals such as desktop, tablet, mobile, etc., and so monitoring cannot take place thereon anyway. In particular, the user interfaces used in this case, i.e. the representations, are often of complex nature, and so a rapid overview and, in association therewith, a rapid reaction to problems currently arising are possible only with difficulty. The representation of a data stream either is intuitively recognizable or provides an overview of the amount and/or type of data. Although this affords representation of the fact that data quantities are arising and/or something is running in the background, monitoring of data streams is not made available by the intuitively ascertainable representations.

SUMMARY

Teachings of the present disclosure include various embodiments such as a data monitor in the form of an intuitively ascertainable representation in real time of transferred data quantities. For example, some embodiments include a digital data monitor, comprising at least one dial having indices indicating points in time, wherein segments representing information about digital data and/or digital data streams are arranged within and/or around the dial, and wherein the segments are each assignable to one index or a plurality of indices of the dial, in a manner conveying a point in time and/or a time interval.

In some embodiments, a segment or a part of a segment represents information about data and/or data streams of data quantities, data types, data contexts and/or metadata as a result of measurement of incoming data.

In some embodiments, a segment or a part of a segment represents information about data and/or data streams of data quantities, data types, data contexts and/or metadata as a result of measurement of outgoing data.

In some embodiments, a segment or a part of a segment represents information about data and/or data streams of data quantities, data types, data contexts and/or metadata as a result of measurement of generated data.

In some embodiments, the data monitor is part of a smartphone.

In some embodiments, the data monitor is part of a smartwatch.

In some embodiments, the data monitor is part of a desktop monitor.

In some embodiments, the data monitor is part of a tablet.

In some embodiments, the data monitor is part of a projector.

In some embodiments, the data monitor includes a round dial. In some embodiments, segments are provided along the circumference of the dial. In some embodiments, segments are provided within the dial. In some embodiments, the dial has indices representing 12 hours. In some embodiments, the dial has indices representing the 60 minutes of an hour.

In some embodiments, there is a plurality of nested dials.

DETAILED DESCRIPTION

Figure 1:
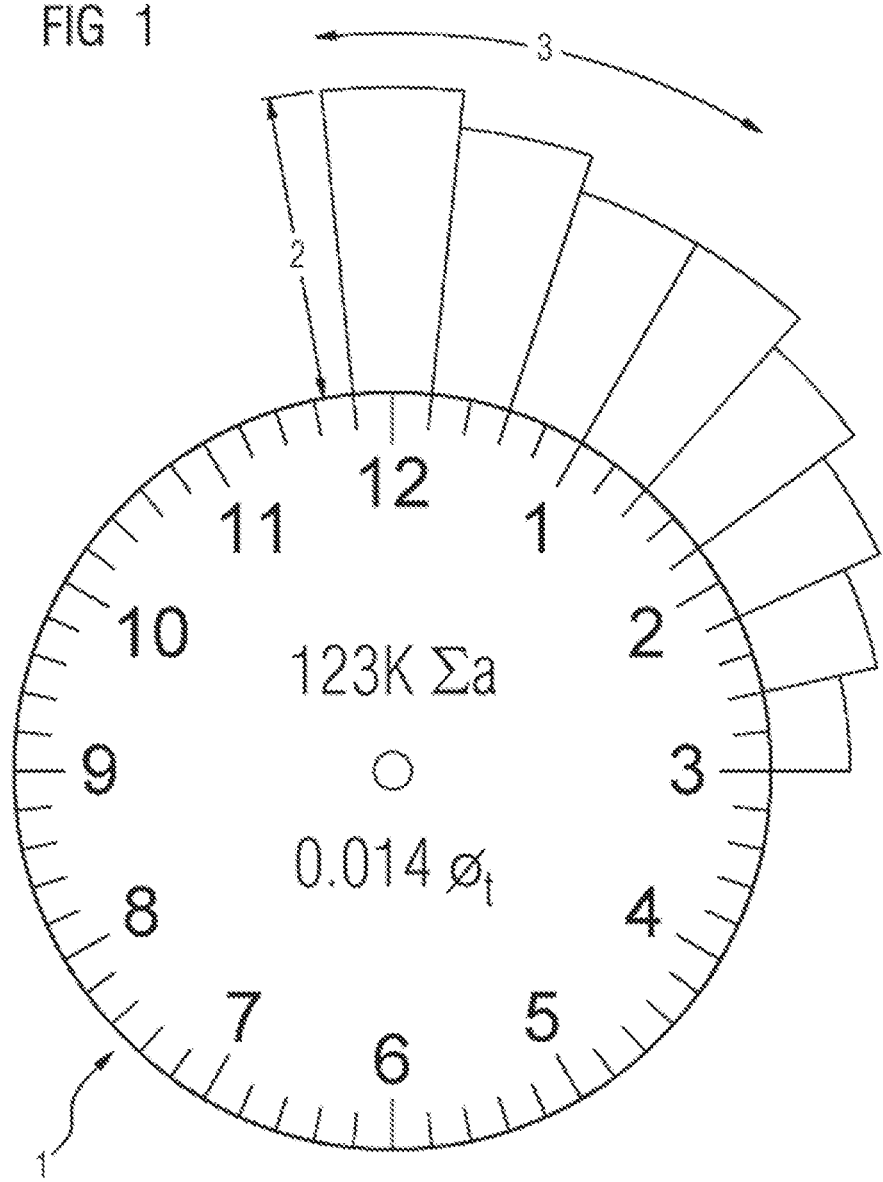
FIG. 1 shows the representation of a dial provided on display devices of computers incorporating teachings of the present disclosure.

Various embodiments of the teachings herein include a digital data monitor, comprising at least one dial having indices indicating points in time, wherein segments representing information about digital data are arranged within and/or around the dial, and the segments are each assignable to one index or a plurality of indices of the dial, in a manner conveying a point in time and/or a time interval.

Continuous monitoring of digital data and/or digital data streams is of interest in order to assess incoming and outgoing data in terms of their context. In this case, a dial provides a "natural" background for any users for the representation of a temporal progress and was combined with a complex and structured representation for the clear and intuitive recognition of data, metadata, data types and/or data streams and/or data contexts to form a novel structure and/or architecture of data representation. This combination of one dial or a plurality of dials with data-representing segments enables the user easily and intuitively to ascertain physically complicated processes such as the type and/or transfer of data projected onto time. As a result, the current situation and/or the temporal sequence of the data and/or of the respective data stream, data context are/is imparted to the user.

In some embodiments, a data context is displayed by way of the dial of a 12 or 24 hour clock, for example, in which, in the respective outer and/or inner segments, the relevance of the data that have arisen in the time unit is imparted to the user by the shape, size, color intensity and/or height of the segment.

In some embodiments, a data context is displayed with the aid of a 24 hour dial in which, by means of the respectively assignable segment, the relevance of the data that have been collected and/or have flowed in the time unit is communicated to the user by the shape, height, graphical representation, etc. of a rectangle such as a bar and/or by color. In the example of a dial representing a 24 hour clock, the user has at a glance an impression of the data context over 24 hours.

In some embodiments, by selecting a portion and by zooming into a segment, for example, the user obtains a more accurate insight into the represented data and/or the represented data stream.

In some embodiments, the monitor can be rendered on various screen sizes from projector through desktop monitor, tablet, smartphone to smartwatch. In the case of all these devices, it is a considerable advantage for the user if, easily and in an uncomplicated manner, like the state of charge of a rechargeable battery, for example, the user can ascertain how many data/data streams are currently being generated and/or transferred by the device and/or have been generated and/or transferred by the device during the past hours.

"Smartphone" denotes a cellular phone having extensive computer functionalities and connectivities. Owing to the permanently included Internet access and/or Bluetooth functionalities and thus use of the forms of communications such as WhatsApp and Instagram, considerable amounts of incoming and outgoing data and/or data streams will also arise in the case of a smartphone.

"Projector" denotes a video projector or digital projector which projects still and/or moving images from a visual output device of digital data such as a television receiver, a computer, a DVD player, a video recorder, etc. in enlarged form onto a screen. Considerable digital data quantities and digital data streams, incoming and outgoing, also arise in this case.

"Desktop monitor" generally denotes a screen which, as a visual output device, is connected to a computer.

"Tablet" or "tablet computer" denotes a flat portable computer, in particular in combination with a "touchscreen". Tablets, just like smartphones and/or "smartwatches", are Internet-enabled and also have further connectivities, such that they optionally process an amount of generated and/or transferred data and/or data streams.

In the present disclosure, "computer" denotes a device which processes, receives and/or transmits digital data by means of programmable computation specifications. In the present case, computer accordingly denotes a digital computer and not an analog computer. Whereas a digital computer with digital device units processes digital data—i.e. numbers and text characters—an analog computer is a computer which processes analog data, such as e.g. continuously progressing electrical measurement variables such as voltage or current.

In the present disclosure, "dial" denotes a two-dimensional, graphical rendering of a time scale, such as the clock scale—for example conventionally known from analog clocks. A dial may be circular, but can also be angular, oval, etc. In order to display the time of day, the dial is subdivided into uniform sections. Usually, the dial is subdivided twelve times in order to display the hours, and 60 times in order to display the minutes and seconds. In order to represent the division of time, indices, e.g. in the form of numbers, digits, are placed on the dial, 1 to 12 or respectively 1 to 24 for the hours, 0 to 60, often in steps of 5 or 10, for minutes or seconds. The instruction of a conventional dial is based on the course that the sun appears to take in the northern hemisphere: when looking toward the south, the sun rises on the left (in the east), is at its highest point at midday and sets on the right (in the west); this explains the progression of numbers in the "clockwise direction" and the fact that the "12" is at the top.

A dial within the meaning of the present disclosure can have a typical construction in the sense mentioned above, but can also have a different construction, for example with the "6" at the top and designed for 24 hours. Furthermore, a dial can also have a construction that deviates from 12 and 24 hours, and a progression in the counterclockwise direction.

A dial can furthermore also combine a plurality of dials in one construction; by way of example, an inner dial with segments can rotate within an outer dial with segments, either staggered in time or at the same time or oppositely, the position of the dials with respect to one another also again providing information for the user, such as incoming, outgoing data and/or data quantity, a second dial providing the data type, a third dial providing the metadata, etc. This is also referred to hereinafter as a data monitor, comprising a plurality of nested dials.

In the present disclosure, "segment" means a graphical rendering of information which conveys a result of a measurement of generated and/or transferred data and/or data streams, a segment being assignable to a point in time or a time interval by way of one or more indices on the dial. A segment is situated within, outside and/or around the dial. A segment provides the user with information about data processing, data generation and/or data transfer at the time being displayed by the index, the size of the segment for example increasing linearly with the amount of the measured data and/or measured data stream. That is then a particularly intuitively easily recognizable display. However, the size can also logarithmetically convey the amount of data and/or the scope of the data stream.

Outside and/or within the dial there may be a plurality of segments which are assignable to an index on the dial. These segments each indicate different items of information; by way of example, the outer segments serve to provide information about the data that have flowed within one hour, and the inner segments give information about the data that have flowed within one minute. In some embodiments, the outer segments convey the outgoing data and the inner segments convey the incoming data. The diversity of the data monitor is virtually unlimited in this regard.

A segment can be present in portions without steps and/or in a manner subdivided in sections.

In some embodiments, the fact of whether incoming or outgoing data are involved can also be made distinguishable by the segment and/or the position of the segment within or outside the dial. A segment can have any desired shape, for example can be a rectangle, bar, line and/or trapezoid. A segment can differ from other segments in terms of hatching, coloring, dimension, graphical representation of the dimensionality, e.g. two-dimensional or three-dimensional, information in each case being representable to the user by virtue of the distinction.

A line can generally represent the transfer of data quantities. In this case, the length of the line can indicate to the user how many data are currently being generated and/or transferred, and the color in the line in turn indicates for example the type of data involved, i.e. e.g. image, sound and/or word data.

A segment can be assigned a specific type of data; by way of example, a line represents data quantities, a triangle represents metadata, a rectangle represents a data type, such as a word and/or image file, and in this case a yellow line represents a pdf file, etc. By way of example, an ellipse can be assignable to a specific data context, the size, length, color, color intensity of the segment conveying the amount of data of this data context, etc.

There are a large number of possibilities for characterizing the segment or a part of a segment in order that information can be conveyed thereby: examples thereof are the shape, size, contour, circumference, color and/or dimensionality of the representation. However, not only can a segment convey information, but it can be subdivided into a plurality of parts which are each differently colored and/or provided with different hatching and enable further information to be transferred at a glance.

The information that can be conveyed by a segment can relate to the scope of generated and/or transferred digital data and/or digital data streams at a given point in time and/or per unit time and/or in a given time interval and/or simply in real time. The generated and/or transferred data and/or data streams represented by a segment can be assignable—for example—to "data quantities", "data types", "metadata" and/or "data contexts".

A "data stream" denotes a continuous flow of digital data sets, the end of which is usually not foreseeable in advance, the data sets being processed continuously as soon as a new data set has arrived in each case. Data stream also generally denotes, in particular, "electronically coded data at the stage of communication". The individual data sets are of any desired data type, which however is fixed per data stream. The amount of data sets per unit time, i.e. the data rate, can vary. Data streams are often used for interprocess communication, i.e. for communication among processes on a computer, and for the transfer of digital data via networks, in particular for streaming media.

"Metadata" or metainformation includes structured data containing information about features of other data. Metadata are data that describe data. One typical example of metadata is the system catalogue of a database, which contains the definitions of all tables and columns. The metadata of a computer file include, inter alia the file name, the type of file, the access rights, the size, the name of the author and the date of the last change.

"Data quantity" is typically understood to mean big data. By way of example, the term "big data", originating from the English-speaking world, denotes such data quantities which relate to four dimensions,
  scope and volume of data
  speed at which the data quantities are generated and/or transferred,
  bandwidth of the data types and data sources and
  authenticity of the data.

During the representation of the data quantity at a given time by a segment, it is furthermore possible—if a specific feature is sought in the data quantity—to optically incorporate whether or not it is contained there at a given point in time and/or per unit time and/or in a given time interval or simply in real time.

A "data type" is the combination of object quantities with the operations defined thereon. In this case, for example, the names of these object and operation quantities are designated by the data type of the data set using a so-called signature. On the other hand, "data type" also denotes the combination of concrete value ranges and operations defined thereon. By way of example, bit quantities are a "data type".

"Data context" denotes a context in which data objects or entities in domain-driven designs are used in specific roles. During the measurement of data context quantities, therefore, rather than just the data quantities being measured, the latter are measured in association with the application case(s) of the application(s). The data objects which play a specific role in an application case or in a app, i.e. application, are identified with the aid of the data context. By way of example, the location-specific data used for the corona app are measured by a data monitor incorporating teachings of the present disclosure. Segments that render data contexts at a given time can be constructed for example such that they contain markings which are statements as to whether the data context applies to specific data or whether the data flow into the app but are not processed by the latter, etc.

The measurement of the generated and/or transferred data and/or data streams at a given point in time and/or per unit time and/or in a given time interval or simply in real time, by means of which segments are displayed, is effected by the measurement of the assignable electrical signals. The results of the measurement at a given point in time provide the input for representing the segment assigned to this point in time on the index of the dial.

The blank part of the dial, for example the center of the dial, can also be used for representing further information in a numbered manner or in some other manner; by way of example, the rendering of KPIs (Key Performance Indicators) can be provided in the center of a round dial; such that the user acquires information by this means, too, such as e.g. the direct feedback concerning the variables that have arisen in the respective data context.

FIG. 1 shows a representation of a dial such as is provided on arbitrary display devices of computers incorporating teachings of the present disclosure. The conventionally configured dial 1 can be discerned, here in this example with hours being divided in a customary way from 0 to 12 in the clockwise direction. This embodiments, by way of the digital data monitor, shows the accumulation of the digital data, data contexts and/or data streams e.g. in real time on a conventional dial scale, for 12 hours. The scale on the dial is arbitrary and can be 12, 24 hours or else just 6 or 18 hours, through to 1 day, 1 week, 1 month, as required. Some data streams may be transferred at night, some at the weekend only on Saturdays, the scale on the dial depending on the application.

The data quantity and/or accumulation is represented by the radial length 2 of the individual segments in accordance with FIG. 1. The accumulated data quantity is rendered by the varying height 2 of the segments—or of the bar columns. The length 3 along the circumference shows the time frame in which the monitored device experiences a specific load of digital data. The fact of whether the data transfer rate was high or low at a specific point in time can thus be ascertained intuitively and at a glance.

Figure 2:
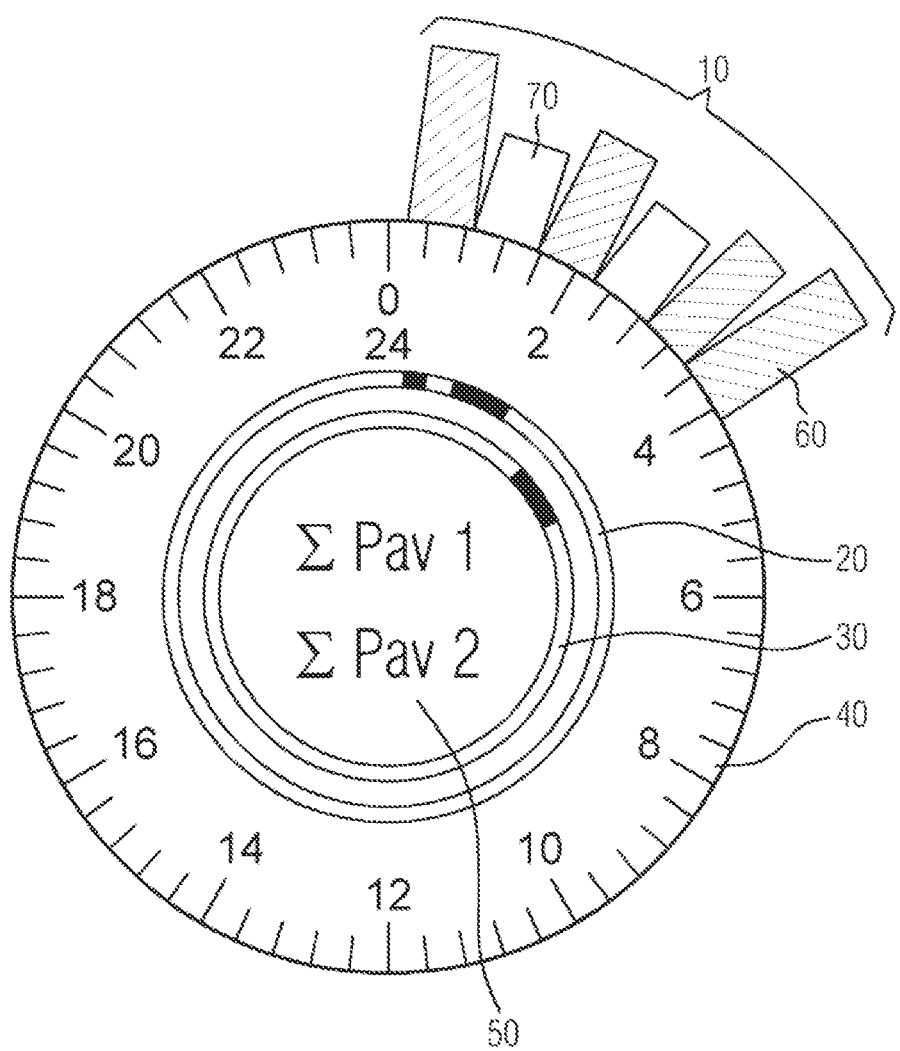
FIG. 2 shows a representation similar to that in FIG. 1.

FIG. 2 shows a representation similar to that in FIG. 1. A 24 hours dial 40 with a corresponding scaling can be discerned this time. Two double circles 20 and 30 can also be discerned within the dial 40. These double circles depict the time frame at which a data transfer takes place, either data reception—e.g. the inner circle 30—or data transmission—the outer circle 20. At the beginning of a data transfer, for example the transmission of a digital data quantity X, a circle segment in the form of a black bar begins to grow within the double circle, too, from the point in time of the first data transfer. The bar represents the circle segment and concomitantly grows with the progression of the clock for as long as data transfer takes place. This circle segment in the form of a concomitantly growing bar cannot display a transferred data quantity, but by virtue of its expanding, it indicates that data transfer is currently happening. When it stops it indicates that the transfer has ended or stopped.

The bar columns 10 do indeed display the quantities. As also already in the exemplary embodiment presented in FIG. 1, here as well the height, i.e. the radial length, of the bar column makes it clear how many data are being transferred. If nothing is happening and no data transfer is taking place, then in this embodiment, in order that it is clear that the display is running, an empty bar column 70 is shown. If data are being transferred, i.e. received and/or transmitted, then a bar column 60 that is filled in is displayed. The bar columns 10, 60 and 70 are created and depicted on the basis of the selected time segments. Consequently, the user rapidly has an overview of the data. All the more data/data quantities have arisen in the corresponding time period, the higher the bar column 10, 60 and/or 70. By means of different colors of the bar columns and/or different hatching, instances of a limit value being exceeded can moreover also be represented and/or displayed in a contrasted manner; within a bar column as well it is possible, for example, for an upper fraction of the bar column to flash in a neon-colored manner if a limit value has been exceeded, such that the user, even in the case of a plurality of monitors or relatively large monitors, out of the corner of his/her eye, recognizes the instance of a limit value being exceeded and can implement measures.

In the inner area of the dial 50—once again by way of example—the sum of the transferred digital data is displayed. The transmitted data are at the top, and the received data at the bottom. It is thus also possible to conduct "bookkeeping" as to when a memory is overloaded and when it still has free memory space available. It goes without saying that the inner area of the dial 50 can also be used for the representation of other parameters.

In some embodiments, the representation of a revolution of the time frame represented on the dial is stored in each case and it is possible to scroll through the representations of past days, weeks and/or hours. The storage can also take place continuously.

The data monitors described herein can be used in a very versatile way for monitoring a load of a device such as a smartphone owing to generated and/or transferred data. The information is generated from a wide variety of measurements that produce results in the form of data, and is represented by segments arranged on/in a dial. By way of example, it is possible to display data transfer quantities, yield as a result of insolation over time, radioactive dose over time, risk assessment for trains traveling at the same time, quantities of humans in a public area, etc., provided that the data are present digitally.

The digital data monitor displays the accumulation of the data or data contexts or data streams within the time frame predefined on the dial. The time frame can encompass 12 or 24 hours, but also weeks, months, years. The digital data and/or the digital data streams are acquired, depending on the system, by means of corresponding measurements and/or data transfer volumes, for example in a manner accurate to the hour, minute and/or second.

A data monitor as described herein enables a user to rapidly assess a certain data context in a time frame that has arisen. A problem posed, sometimes evaluated by an AI, can be demonstrated by corresponding features of the segments, for example coloring. Conflicts that have occurred or looming conflicts are deduced more rapidly if, for example, the data streams continuously increase and a load limit of the device will be reached within a short time.

In the case of the embodiment of the data monitor with a circular dial, a good and space-saving representation on all screen sizes is possible.

What is claimed is:

1. A digital data monitor comprising:
   a dial with indices indicating points in time; and
   a plurality of segments, each segment comprising a graphical rendering representing information measuring an amount of about digital data or data streams generated and/or transferred at a point in time and/or a time interval;
   wherein each of the plurality of segments is arranged within and/or around the dial at
   one index or a plurality of indices of the dial corresponding to the associated point in time and/or time interval.

2. The data monitor as claimed in claim 1, wherein a segment or a part of a segment represents information about data and/or data streams of data quantities, data types, data contexts and/or metadata as a result of measurement of incoming data.

3. The data monitor as claimed in claim 1, wherein a segment or a part of a segment represents information about data and/or data streams of data quantities, data types, data contexts and/or metadata as a result of measurement of outgoing data.

4. The data monitor as claimed in claim 1, wherein a segment or a part of a segment represents information about data and/or data streams of data quantities, data types, data contexts and/or metadata as a result of measurement of generated data.

5. The data monitor as claimed in claim 1, displayed on a smartphone.

6. The data monitor as claimed in claim 1, displayed on a smartwatch.

7. The data monitor as claimed in claim 1, displayed on a desktop monitor.

8. The data monitor as claimed in claim 1, displayed on a tablet.

9. The data monitor as claimed in claim 1, displayed on a projector.

10. The data monitor as claimed in claim 1, wherein the dial is round.

11. The data monitor as claimed in claim 1, wherein at least some of the segments are disposed along a circumference of the dial.

12. The data monitor as claimed in claim 1, wherein at least some of the segments are disposed within a circumference of the dial.

13. The data monitor as claimed in claim 1, further comprising indices representing 12 hours disposed around the dial.

14. The data monitor as claimed in claim 1, further comprising indices representing the 60 minutes of an hour disposed around the dial.

15. The data monitor as claimed in claim 1, further comprising a plurality of additional dials nested with a circumference of the dial.

* * * * *